Figure 1:
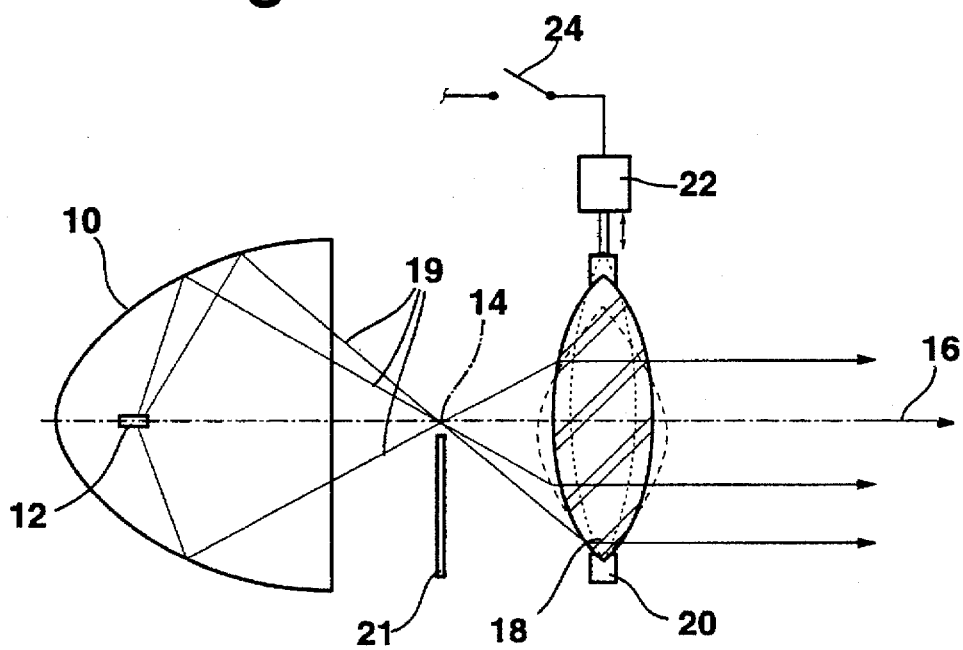

United States Patent [19]
Bertling et al.

[11] Patent Number: 5,672,001
[45] Date of Patent: Sep. 30, 1997

[54] VEHICLE HEADLAMP

[75] Inventors: Johannes Bertling, Vaihingen; Karl-Otto Dobler, Reutlingen; Rainer Neumann, Stuttgart; Henning Hogrefe, Walddorfhaeslach; Heike Eichler, Reutlingen; Martin Lampen, Tuebingen; Doris Boebel, Stuttgart, all of Germany

[73] Assignee: Robert Bosch GmbH, Stuttgart, Germany

[21] Appl. No.: 543,120

[22] Filed: Oct. 13, 1995

[30] Foreign Application Priority Data

Oct. 13, 1994 [DE] Germany .......... 44 36 620.5

[51] Int. Cl.⁶ .................................... F24V 5/00
[52] U.S. Cl. ........................... 362/278; 362/318
[58] Field of Search ...................... 362/278, 318

[56] References Cited

U.S. PATENT DOCUMENTS

| | | | |
|---|---|---|---|
| 2,300,251 | 10/1942 | Flint. | |
| 4,444,471 | 4/1984 | Ford et al. | 350/423 |
| 4,514,048 | 4/1985 | Rogers | 350/423 |
| 4,783,153 | 11/1988 | Kushibiki et al. | 350/409 |
| 5,438,486 | 8/1995 | McNair | 362/318 |

FOREIGN PATENT DOCUMENTS

| | | | |
|---|---|---|---|
| 442466 | 11/1948 | Italy | 362/318 |
| 441971 | 11/1948 | Italy | 362/318 |

*Primary Examiner*—Carroll B. Dority
*Attorney, Agent, or Firm*—Michael J. Striker

[57] ABSTRACT

The headlamp has a reflector (10) and a light source (12). Disposed in the ray path of the light reflected from the reflector (10) there is a lens (18), which is received in a mounting (20) and consists of an elastically deformable material. The lens (18) is acted upon by at least one control element (22), by which a force can be applied to the lens (18) in order to deform it. The light passing through the lens (18) is influenced, i.e. deflected in its direction. In the nondeformed state of the lens (18) the light beam radiating from the headlamp exhibits a first characteristic, i.e. direction and scatter, and in the deformed state of the lens (18) the light beam radiating from the headlamp, because of the then different optical effect of the lens (18), exhibits a different, second characteristic.

7 Claims, 2 Drawing Sheets

1

VEHICLE HEADLAMP

PRIOR ART

The invention derives from a vehicle headlamp of the generic type of claim 1.

A headlamp of this kind is known by virtue of DE 35 07 013 A1. This headlamp has a reflector and a light source and in the ray path of the light reflected from the reflector there is disposed a light-transmitting element in the form of a lens. The light passing through is influenced by the lens, i.e. deflected in its direction. The shape of the lens and that of the reflector are mutually matched such that the light beam radiating from the headlamp exhibits a certain characteristic, i.e. direction and scatter. This one characteristic of the light beam is not optimal for all traffic and/or weather conditions but cannot be changed in the case of this particular headlamp.

ADVANTAGES OF THE INVENTION

The vehicle headlamp according to the invention, having the features of claim 1, has the advantage in contrast to the above that the characteristic of the light beam radiating from the headlamp is able to be changed by the deformation of the light-transmitting element, thereby allowing the characteristic to be adapted to different traffic and/or weather conditions.

Advantageous designs and refinements of the invention are specified in the contingent claims.

DRAWING

Figure 2:
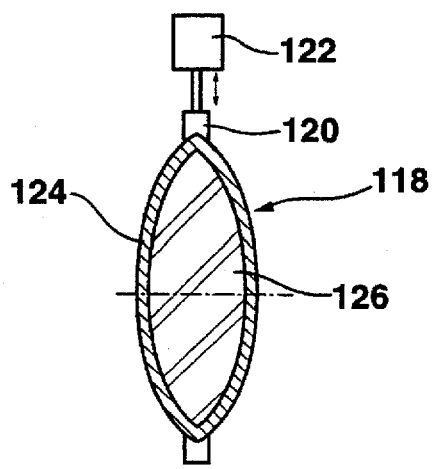
Figure 3:
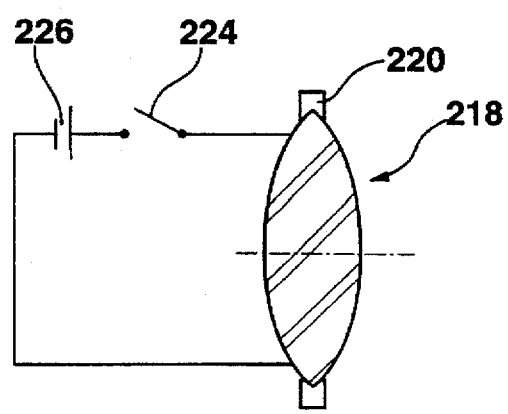
Figure 4:
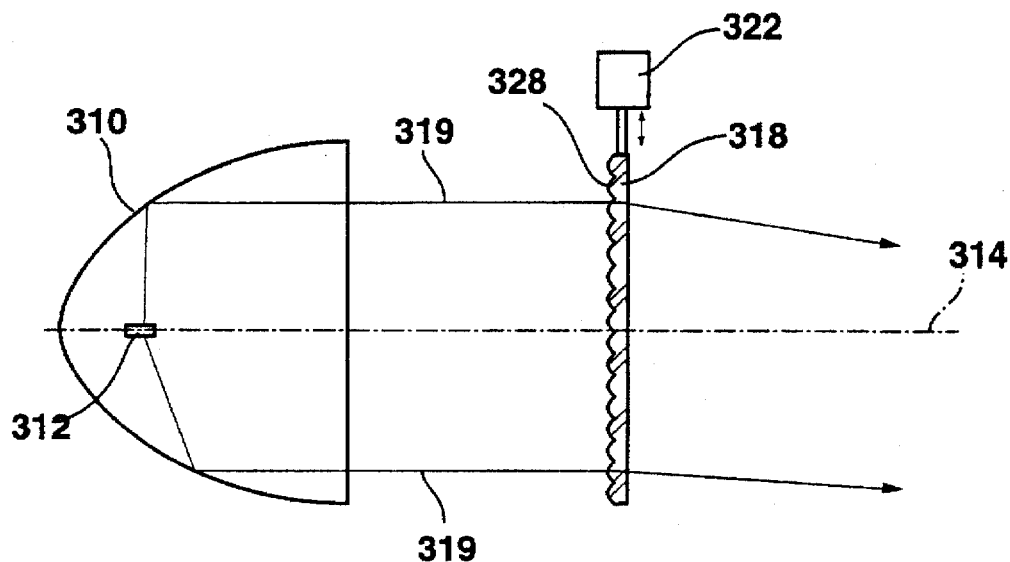
Figure 5:
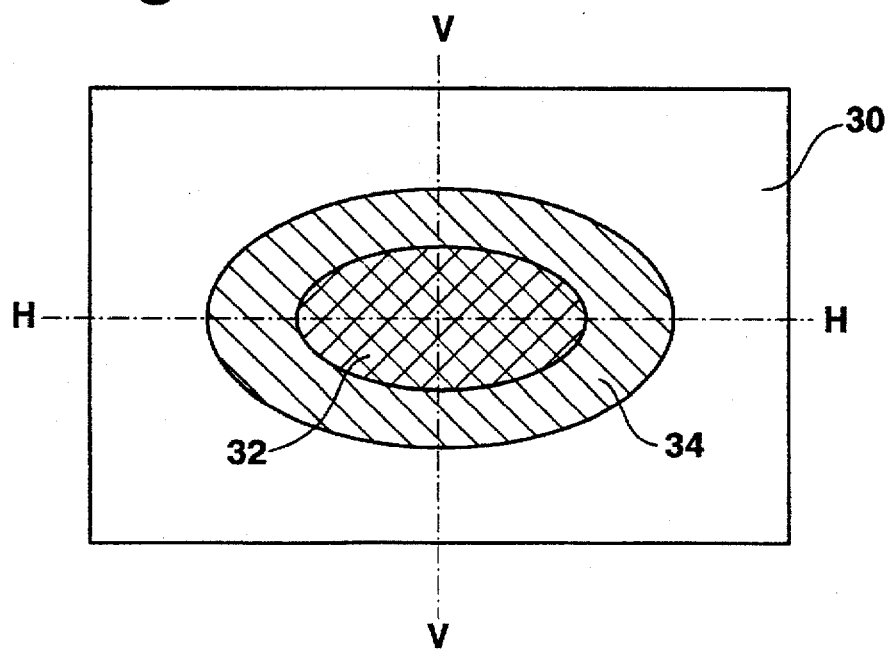

Four illustrative embodiments of the invention are explained in greater detail in the following description and represented in the drawing, in which:

FIG. 1 shows a vehicle headlamp in simplified representation with a light-transmitting element in the form of a lens according to a first illustrative embodiment, FIG. 2 shows the lens according to a second illustrative embodiment, FIG. 3 shows the lens according to a third illustrative embodiment, FIG. 4 shows a fourth illustrative embodiment of the headlamp with a light-transmitting element in the form of a disk displaying optically active elements, and FIG. 5 shows a measuring screen which is disposed in front of the headlamp and is illuminated by light beams emitted by the headlamp in two different states of the light-transmitting element.

DESCRIPTION OF THE ILLUSTRATIVE EMBODIMENTS

A vehicle headlamp, especially for motor vehicles, represented in FIG. 1 has a reflector 10 in which there is inserted a light source 12. The light source 12 can be an incandescent lamp or a gas-discharge lamp. The shape of the reflector 10 is determined such that light emitted from the light source 12 is reflected by the reflector 10 such that it crosses the optical axis 14 of the headlamp, i.e. forms a convergent light beam. After the reflector 10 in the light-radiating direction 16 there is disposed a light-transmitting element 18 in the form of a lens. The lens 18 is of biconvex configuration and has respectively, both in the direction of the reflector 10 and away from it, a convexly curved surface. The lens 18 is disposed coaxially to the optical axis 14 of the headlamp and at such a distance from the reflector 10 that the light rays reflected from the reflector 10 only pass through the lens 18 after having crossed the optical axis 14. The lens 18 corresponds in its effect to a convergent lens and the light rays 19 passing through are refracted by it towards the optical axis 14, so that, after having passed through the lens 18, they run more or less parallel to the optical axis 14. Between the reflector 10 and the lens 18 it is possible to dispose a diaphragm 21, by which a light-dark boundary of the light beam produced from the headlamp is formed.

In the first illustrative embodiment represented in FIG. 1, the lens 18 consists of a solid, elastically deformable and light-transmitting material, for example an elastic synthetic material. It is also however possible for the lens 18 to be made in part-regions from a rigid material and only in the other part-regions from an elastically deformable material. For example, the rigid material can be disposed in the central region of the lens 18 and the elastically deformable material in the marginal region, or vice versa. The lens 18 is disposed in a mounting 20 and the lens 18 is acted upon at its margin by at least one control element 22. A plurality of control elements 22 can also act upon different points on the periphery of the lens 18 and the control elements can act, instead of upon the lens 18, also upon the mounting 20, which is then correspondingly mobile in its configuration. The control element 22 can be actuated, for example, by electrical, electromagnetic, hydraulic or pneumatic means. In the represented illustrative embodiment, the control element 22 acts upon the lens 18 radially in relation to the optical axis 14 and is designed such that it can apply a compressive force, or tensile force to the lens 18. Alternatively, the control element 22 can also act in an optionally different direction upon the lens 18 or upon the mounting 20, depending on the direction in which the control element 22 is meant to apply a force to the lens 18. In FIG. 1, the lens 18 is represented with unbroken lines in a first setting in which it is not deformed, i.e. the control element 22 is neither pressing on the lens 18 nor pulling on it. If the control element 22 applies a compressive force to the lens 18, then its extent radially to the optical axis 14 is thereby reduced and its extent in the direction of the optical axis 14 increased. In this setting, the lens 18 is represented in FIG. 1 with dashed lines. If the control element 22 applies a tensile force to the lens 18, then the extent of the lens 18 radially to the optical axis 14 is correspondingly increased and its extent in the direction of the optical axis 14 reduced. In this setting, the lens 18 is represented in FIG. 1 with dotted lines.

The mounting 20 is configured such that a deformation of the lens 18 is possible under the influence of the control element 22. The mounting 20 can be configured such that the lens 18, under the influence of the control element 22, is purposefully deformed in a certain manner, for example only in the direction in which the force applied by the control element 22 acts, i.e. such that, when the control element 22 acts in the vertical direction, the lens 18 is compressed or extended in the vertical direction only. The mounting 20 can also however be configured such that the lens 18 is evenly compressed or extended over the whole of its periphery.

Upon deformation of the lens 18, which deformation is brought about by the control element 22, its optical properties are changed, i.e. the light which passes in the various settings through the lens 18 is differently deflected by the lens 18. The deformation of the lens 18 is shown in highly exaggerated representation in FIG. 1 in order to illustrate this. In practice, deformation paths of the lens 18 in the region of tenths of a millimeter are already sufficient to alter the optical properties of the lens 18 to the point where the light passing through is influenced in a markedly different manner. For the deformation of the lens 18, the control element 22 is activated from the vehicle steering wheel, by means of a switch 24, for example.

FIG. 5 illustrates a measuring screen 30 which is disposed in front of the headlamp and represents the projection of a carriageway disposed in front of the headlamp, which carriageway would be correspondingly illuminated during real use of the headlamp. The horizontal center plane of the measuring screen 30 is denoted by HH and its vertical center plane by W. In the non-deformed state, the light passing through is influenced by the lens 18 such that it exhibits a first characteristic, i.e. direction and scatter. In the illustrative embodiment, the light passing through is influenced by the lens 18 in the non-deformed state such that it is directed roughly parallel to the optical axis 14 and illuminates the measuring screen 30 in a region denoted by 32. This region 32 is disposed roughly concentrically to the point of intersection EV of the horizontal center plane EH and the vertical center plane W of the measuring screen 30 and is narrowly bounded, since the light beam radiating from the headlamp runs essentially parallel to the optical axis 14 and exhibits only a minor scatter. In the deformed state of the lens 18, the light passing through is influenced by it such that, once it has passed through, it exhibits a second characteristic different from the first characteristic. In the illustrative embodiment, the light passing through the lens 18 is directed by it in the deformed state not precisely parallel to the optical axis 14; rather, the light follows a convergent course when the lens 18 is compressed into its dashed setting or a divergent course when the lens 18 is extended into its dotted setting. The light beam radiating from the headlamp thereby exhibits a scatter and illuminates the measuring screen 30 in a region denoted by 34, which is markedly larger than the region 32. If the lens 18 is purposefully deformed only in a certain direction, this can have the effect, for example, of making the region 34 project over the region 32 only in the horizontal direction.

FIG. 2 illustrates a second illustrative embodiment of the lens 118, in which the lens has a casing 124 made from an elastically deformable, light-transmitting material, which casing encloses a filling 126 likewise made from light-transmitting material. The casing 124 can consist, for example, of an elastic synthetic material and, as filling 126, a liquid, a gelatinous material or, likewise, an elastically deformable material can be used. The lens 118 is disposed in a mounting 120, which can be configured like the above-described mounting 20. The lens 118 or mounting 120 is acted upon by the at least one adjusting element 122, by which the lens 118 or the mounting 120 and lens 118 are able to be deformed.

The deformation of the lens 118 can be realized as indicated in the first illustrative embodiment and the effect of the deformation has the same repercussions upon the light passing through the lens 118 as already described there.

FIG. 3 illustrates a third illustrative embodiment of the lens 218, in which the lens 218 contains, at least in parts, piezoelectric crystals. These piezoelectric crystals have the property of changing their extent under the influence of an electric voltage. The lens 218 is once again disposed in a mounting 220 and the piezoelectric crystals are connectable by a switch 224 to a voltage source 226. When the piezoelectric crystals are connected to the voltage source 226, the lens 218 is deformed in this region and, as in the above-described illustrative embodiments, the optical effect of the lens 218 is thereby altered.

According to a fourth illustrative embodiment of the headlamp, which is represented in FIG. 4, in place of the above-described lenses there can also be used as the light-transmitting element a light-transmitting disk 318, which has optically active elements 328 in the form of lenses and/or prisms. Light emitted from the light source 312 is reflected by the reflector 310 such, for example, that the light rays 319 run roughly parallel to the optical axis 314 of the headlamp. The light is influenced, i.e. deflected, by the optically active elements 328 in such a way that the light beam radiating from the headlamp has a certain characteristic, i.e. direction and scatter. The disk 318 is deformable, at least in parts, and can be configured as in the above-described illustrative embodiments of the lens, i.e. can be made from an elastically deformable, solid material, can consist of an elastically deformable casing with filling or can contain piezoelectric crystals. The disk 318 is acted upon, for its deformation, by a control element 322.

As a result of the deformation of the disk 318, the effect of the optically active elements is changed, so that the light passing through the disk 318 in the deformed state is deflected by the optically active elements 328 differently than in the non-deformed state of the disk 318. The light beam which radiates from the headlamp in the deformed state of the disk 318 therefore exhibits a characteristic which is different than the characteristic of the light beam when the disk 318 is in the non-deformed state.

We claim:

1. A vehicle headlamp, comprising a reflector; a light source; a light-transmitting element located in a ray path of a light reflected from said reflector so as to influence the light passing through said light-transmitting element, said light-transmitting element having at least a region which is deformable in order to change the influence exerted upon the light passing through said light-transmitting element, said region of said light-transmitting element containing piezoelectric crystals; and an electric voltage source connected to said piezoelectric crystals in order to deform said region of said light transmitting element.

2. A headlamp as defined in claim 1, wherein said light-transmitting element is elastically deformable.

3. A headlamp as defined in claim 2, wherein said light-transmitting element is composed of an elastically deformable material.

4. A headlamp as defined in claim 2, wherein said region of said light-transmitting element includes an elastically deformable casing and a filling enclosed by said casing.

5. A headlamp as defined in claim 1, and further comprising a control element acting upon said light-transmitting element at least indirectly so as to deform said light-transmitting element.

6. A headlamp as defined in claim 1; and further comprising a mounting supporting said light-transmitting element.

7. A headlamp as defined in claim 1, wherein said light-transmitting element is formed as a lens.

* * * * *